United States Patent
Kuzdeba et al.

(10) Patent No.: US 12,038,530 B2
(45) Date of Patent: Jul. 16, 2024

(54) REALTIME ELECTRONIC COUNTERMEASURE ASSESSMENT

(71) Applicant: BAE SYSTEMS Information and Electronic Systems Integration Inc., Nashua, NH (US)

(72) Inventors: Scott A Kuzdeba, Hollis, NH (US); Brandon P. Hombs, Merrimack, NH (US); Daniel Massar, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 185 days.

(21) Appl. No.: 16/953,579

(22) Filed: Nov. 20, 2020

(65) Prior Publication Data

US 2022/0163628 A1 May 26, 2022

(51) Int. Cl.
*G01S 7/36* (2006.01)
*G01S 7/02* (2006.01)

(52) U.S. Cl.
CPC .............. *G01S 7/36* (2013.01); *G01S 7/021* (2013.01)

(58) Field of Classification Search
CPC .............. G01S 7/36; G01S 7/021; G01S 7/38
See application file for complete search history.

(56) References Cited

U.S. PATENT DOCUMENTS 4,990,920 A * 2/1991 Sanders, Jr. .............. G01S 7/38
342/14
5,061,930 A * 10/1991 Nathanson ............ F41G 7/2246
342/13

(Continued)

FOREIGN PATENT DOCUMENTS

| CN | 110109059 A | | 8/2019 | |
| CN | 111366899 A | * | 7/2020 | .............. G01S 7/36 |
| EP | 1291667 A2 | | 3/2003 | |

OTHER PUBLICATIONS

CN111366899AMT.pdf—DES.pdf, machine translation of CN111366899A (Year: 2020).*
Office Action for U.S. Appl. No. 16/953,659 mail date Jun. 30, 2022, 36 pages.
Classification, Denoising, and Deinterleaving of Pulse Streams with Recurrent Neural Networks by Zhang-Meng Liu published by IEEEAug. 2019 (Year: 2019).
Office Action for U.S. Appl. No. 16/953,562 mail date Aug. 23, 2022, 32 pages.
Office Action for U.S. Appl. No. 16/953,562 mail date Apr. 29, 2022, 22 pages.

(Continued)

*Primary Examiner* — Timothy A Brainard
*Assistant Examiner* — Kenneth W Good
(74) *Attorney, Agent, or Firm* — Maine Cernota & Curran; Gary McFaline

(57) ABSTRACT

A method of assessing the effectiveness of an electronic countermeasure (ECM) applied against an unknown, ambiguous, or unresponsive radar threat includes monitoring changes in a radar-associated factor while applying the ECM and determining if the ECM is disrupting the hostile radar. The radar-associated factor can be a weapon that is controlled by the radar threat, and assessing the ECM can include determining whether the weapon is misdirected due to applying the ECM. Or the radar-associated factor can be a feature of an RF waveform emitted by the radar threat, and assessing the ECM can include determining if the feature is changed due to applying the ECM. Continuous changes in the feature can indicate unsuccessful attempts to mitigate the ECM. Return of the feature to a pre-threat state can indicate disruption of the radar. The ECM can be selected from a library of countermeasures pre-verified as effective against known threats.

16 Claims, 4 Drawing Sheets

(56) References Cited

U.S. PATENT DOCUMENTS

| | | | |
|---|---|---|---|
| 5,150,122 A | 9/1992 | Bell | |
| 5,287,110 A * | 2/1994 | Tran | G01S 7/021 342/16 |
| 5,448,243 A | 9/1995 | Behtke | |
| 5,457,460 A | 10/1995 | Tran | |
| 5,574,458 A | 11/1996 | Tran | |
| 5,606,500 A | 2/1997 | Tran | |
| 6,181,744 B1 * | 1/2001 | Antonaitis | G01S 7/021 348/E5.073 |
| 6,788,243 B2 | 9/2004 | Lavoie | |
| 7,068,209 B2 * | 6/2006 | Gounalis | H04K 3/825 342/99 |
| 7,737,883 B2 * | 6/2010 | Dark | H04K 3/45 342/13 |
| 7,830,297 B1 | 11/2010 | Wang | |
| 8,082,832 B1 | 12/2011 | Tidwell | |
| 8,587,468 B2 | 11/2013 | Card et al. | |
| 9,322,907 B1 | 4/2016 | Kadambe | |
| 9,519,049 B1 | 12/2016 | Kadambe | |
| 10,281,570 B2 | 5/2019 | Parker | |
| 10,365,348 B2 * | 7/2019 | Markel | G01S 7/021 |
| 10,630,712 B2 | 4/2020 | Amor | |
| 10,800,392 B2 | 10/2020 | Alam | |
| 10,907,940 B1 | 2/2021 | Parker | |
| 10,908,252 B2 | 2/2021 | Grandin | |
| 10,924,308 B1 | 2/2021 | Crawford | |
| 11,181,346 B1 * | 11/2021 | Barfoot | F41G 7/2246 |
| 2003/0085831 A1 | 5/2003 | Lavoie | |
| 2009/0224956 A1 | 9/2009 | Dark | |
| 2010/0253567 A1 | 10/2010 | Factor | |
| 2011/0148699 A1 | 6/2011 | Anderson | |
| 2016/0107643 A1 | 4/2016 | Mizutani | |
| 2016/0238694 A1 * | 8/2016 | Kishigami | G01S 7/0233 |
| 2017/0160379 A1 * | 6/2017 | Markel | G01S 7/38 |
| 2017/0192089 A1 * | 7/2017 | Parker | H04K 3/45 |
| 2017/0293025 A1 | 10/2017 | Davis | |
| 2018/0146003 A1 | 5/2018 | Amor | |
| 2018/0297573 A1 | 10/2018 | Alam | |
| 2019/0080187 A1 | 3/2019 | Inoue | |
| 2019/0162818 A1 | 5/2019 | Grandin | |
| 2019/0342331 A1 | 11/2019 | Schetina | |
| 2020/0153535 A1 | 5/2020 | Jayaweera | |
| 2020/0166607 A1 | 5/2020 | Jolly | |
| 2020/0278419 A1 | 9/2020 | Borosak | |
| 2020/0334961 A1 | 10/2020 | Kaindl | |
| 2020/0371201 A1 | 11/2020 | Labudec, Jr. | |

OTHER PUBLICATIONS

Office Action for U.S. Appl. No. 16/953,568 mail date May 23, 2022, 38 pages.

Final Office Action for U.S. Appl. No. 16/253,659 mail date Jul. 3, 2023, 28 pages.

Notice of Allowance for U.S. Appl. No. 16/953,568 mail date Jan. 12, 2023, 21 pages.

Advisory Action for U.S. Appl. No. 16/953,659 mail date Jan. 18, 2023, 11 pages.

Final Office Action for U.S. Appl. No. 16/953,659 mail date Nov. 4, 2022, 32 pages.

Advisory Action for U.S. Appl. No. 16/953,562 mail date Nov. 4, 2022, 3 pages.

Final Office Action for U.S. Appl. No. 16/953,568 mail date Oct. 11, 2022, 31 pages.

Office Action for U.S. Appl. No. 16/953,562, mail date Dec. 7, 2022, 30 pages.

Office Action for U.S. Appl. No. 16/953,659 mail date Feb. 27, 2023, 32 pages.

A. Erdogan and K. George, "Deinterleaving Radar Pulse Train Using Neural Networks," 2019 IEEE International Conference on Computational Science and Engineering (CSE) and IEEE International Conference on Embedded and Ubiquitous Computing (EUC), New York, NY, USA, 2019, pp. 141-147, doi: 10.1109/CSE/EUC.2019.00036.

P. Louridas and C. Ebert, "Machine Learning," in IEEE Software, vol. 33, No. 5, pp. 110-115, Sep.-Oct. 2016, doi: 10.1109/MS.2016.114.

Final Office Action for U.S. Appl. No. 16/953,562 mail date Mar. 27, 2023, 31 pages.

Office Action for U.S. Appl. No. 16/953,562 mail date Aug. 24, 2023, 26 pages.

Notice of Allowance for U.S. Appl. No. 16/953,659 mail date Sep. 21, 2023, 9 pages.

Final Office Action for U.S. Appl. No. 16/953,562 mail date Dec. 6, 2023, 32 pages.

* cited by examiner

REALTIME ELECTRONIC COUNTERMEASURE ASSESSMENT

STATEMENT OF GOVERNMENT INTEREST

Portions of the present invention may have been made pursuant to United States Defense Advanced Research Projects Agency (DARPA) Contract Number HR0011-13-C-0029, and there may be certain rights to the United States Government.

RELATED APPLICATIONS

This application is related to U.S. application Ser. Nos. 16/953,562, 16/953,568, and 16/953,659, all of which were filed on Nov. 20, 2020. All of these applications are herein incorporated by reference in their entirety for all purposes.

FIELD

The disclosure relates to countermeasures against wireless electronic threats, and more particularly to electronic countermeasures against radar threats.

BACKGROUND

Most of the electronic warfare (EW) countermeasure systems that are currently deployed against radar threats implement an electronic countermeasure (ECM) strategy whereby a detected waveform that is transmitted by a hostile radar is compared to a threat database, i.e. a database of known hostile RF waveforms, so as to match the detected waveform with a known hostile RF waveform and thereby identify the radar threat as being a of a known type and having known behavior and waveform characteristics. The identity of the detected radar is then used to select an appropriate countermeasure strategy and associated parameter settings (if any) from a library of predetermined and pre-verified countermeasures. The selected countermeasure is then applied as specified to mitigate the threat.

This existing approach to electronic warfare relies upon an assumption that hostile radars will almost always be of a known type, will implement previously observed waveforms and other behaviors, and will not be able to respond or adapt to the applied countermeasure. However, the validity of this assumption is increasingly being called into question.

Wireless electronic threats such as hostile radar systems are rapidly evolving from primarily analog systems having RF waveforms and other characteristics that are fixed, or at least limited and predictable in scope, to mainly digital systems having waveforms and other characteristics that are software controlled and programmable, such that the waveforms and other threat characteristics can be easily and quickly changed. As a result of this evolution to primarily digital systems, hostile radars are becoming increasingly "agile," in that they are able to flexibly alter their waveforms, which can render the hostile radar sources more difficult to identify. Therefore, it can no longer be assumed that a majority of the radar threats that are encountered in battle will be of known types emitting known RF waveforms.

As a result, friendly assets that encounter a novel radar threat could be forced either to withdraw, to proceed without applying a countermeasure, or to attempt to apply a countermeasure to the novel radar threat that has previously only been validated for effectiveness against a different, known threat, in the hopes that it may have some effect against the novel threat. As used herein the terms "asset" and "friendly asset" refer to any person or object that is of value and may require protection from hostile threats. For example, an asset can be a fixed or mobile air, land, maritime or space-based vehicle. Some examples include tanks, personnel carriers, helicopters, UAV, planes and ships.

Furthermore, future hostile radar systems will likely be able to sense their environment and adapt their waveforms to maximize performance and automatically attempt to mitigate any detected countermeasures. As a result, the real-time effectiveness of an electronic countermeasure against a hostile radar can no longer be assumed, even if the radar threat is a known threat and the electronic countermeasure has been previously validated for effectiveness against the known hostile radar. This could result in the adoption of a misguided battle strategy under a false assumption that a radar threat has been neutralized, when in fact an applied countermeasure has been mitigated.

What is needed, therefore, is a system and method for assessing in real time the effectiveness of a countermeasure as it is applied against a radar threat.

SUMMARY

The present disclosure is a system and method for assessing the effectiveness of an applied countermeasure against a hostile radar in real time as the countermeasure is applied against the hostile radar under battle conditions.

Definitions of Terms

For ease of expression, and unless otherwise required by context, the following terms and their obvious variants are used herein with the following meanings, unless otherwise required by context:

The terms "hostile radar" and "radar threat" are used herein to refer to any hostile threat that emits electromagnetic radiation and is subject to countermeasures. The term "imminent" radar threat is used herein to refer to a radar threat that poses a current danger to an asset, and the term "imminent" RF waveform refers to an RF waveform that is being emitted by an imminent radar threat.

The terms "countermeasure" and "electronic countermeasure" or "ECM" refer to any action that can be applied against a hostile radar in an attempt to "disrupt" the hostile radar, i.e. to mitigate the threat posed by the hostile radar. The "effectiveness" of an applied countermeasure refers to a degree to which the applied countermeasure is able to "mitigate" the hostile threat, i.e., reduce the threat posed by the hostile radar to an asset. An "effective" countermeasure refers to a countermeasure that meets defined effectiveness criteria by reducing the threat posed by a hostile radar to an acceptable degree. An example of a defined effectiveness criterion could be a requirement that a projectile or missile that is guided by the radar threat is caused to miss its intended target by a defined distance. Another example might be a requirement that a radar threat that changes its behavior when a target is detected, for example by continuing to direct its RF emissions toward the target, is caused by an applied countermeasure to return to a behavior that is typical when a target has not been detected, such as continuously varying the direction in which it emits RF.

The terms "radio frequency" and "RF" are used herein to refer to electromagnetic radiation emitted at any frequency.

The terms "waveform" and "RF waveform" are used herein to refer to all of the fixed and time-varying features that characterize the RF that is emitted by a hostile radar. Examples of features that can characterize an RF waveform include, but are not limited to, static features such as geographic distribution patterns of the emitted RF, number and selection of RF frequencies, and number and relative selections of RF phases, as well as time dependent features such as RF phase variation patterns, RF frequency variation patterns, such as frequency "hopping" patterns, and RF amplitude variation patterns, such as duty factors, timing, and shaping of pulses and/or other amplitude modulations. All time dependent patterns of changes in an RF waveform, i.e. "behaviors" of the RF waveform, are also considered to be features. As such, the term "features" is not limited herein to static features, but is used to refer to both static characteristics and dynamic behaviors of an RF waveform. An RF waveform is always associated with a specific radar. However, it is sometimes convenient to characterize a specific radar as emitting more than one RF waveform, either simultaneously or at different times.

The terms "known" RF waveform and "known" radar threat are used herein to refer to an RF waveform and associated radar threat that have been previously encountered and characterized, and that are included in an available "threat database." It is generally assumed that for each known radar threat included in a threat database a there is at least one known countermeasure recorded in a countermeasure library that has been previously verified to be effective against the known radar threat.

If most or all of the features of an imminent RF waveform are similar or identical to corresponding features of a known RF waveform recorded in a threat database, then the RF waveforms are said to "match," and the known radar threat is said to "match" the imminent radar threat. An imminent RF waveform that matches a known RF waveform included in an available threat database is also referred to as a "known" RF waveform," and an immanent radar threat that is emitting a known RF waveform and is disrupted by a corresponding pre-verified countermeasure is referred to herein as a "known" threat or "known" radar threat.

The term "novel" RF waveform refers to a detected RF waveform having features that do not substantially match a set of features of any known RF waveform. Similarly, the terms "novel" radar threat, "novel" radar and "novel" threat all refer to a radar threat that is emitting a novel RF waveform.

The term "ambiguous" RF waveform refers to an imminent RF waveform that at least partially matches a plurality of known RF waveforms, thereby resulting in an ambiguity as to whether the imminent RF waveform is a match to any of the known RF waveforms, or if the imminent RF waveform is a novel RF waveform that coincidentally has features that overlap with features of the plurality of known RF waveforms. The terms ambiguous threat, ambiguous radar threat, and ambiguous hostile radar all refer to a radar threat that is emitting at least one ambiguous RF waveform.

The terms "unresponsive" radar and "unresponsive" radar threat are used to refer to a radar threat that is emitting a known RF waveform, but against which a countermeasure that was previously verified as being effective against the radar threat is no longer sufficiently effective. The term "unresponsive" RF waveform is used to refer to an RF waveform emitted by an unresponsive radar threat.

The terms "defined" countermeasure and "defined" ECM refer to an electronic countermeasure that is included in a library of available countermeasures and is associated with at least one parameter that must be set or "populated" before the countermeasure is applied. Said parameters are referred to as countermeasure or ECM parameters and/or as the parameters or parameter set of the countermeasure or ECM. A countermeasure in combination with an associated parameter set in which all of the parameters have been specified is referred to herein as a "populated" countermeasure. A given defined countermeasure, when populated by different sets of ECM parameters, may be effective against different known and/or unknown threats.

The term "known" countermeasure refers to a defined countermeasure that has been populated with a corresponding set of ECM parameters (if any), where the defined countermeasure and associated parameter set are both included in an available countermeasure library, and wherein the known countermeasure has been previously verified to be effective against at least one known threat.

According to the present disclosure, during application of an electronic countermeasure (ECM) to a hostile radar, at least one radar-associated "threat factor" that is cooperative with the hostile radar is monitored and evaluated to determine if, and to what degree, the threat factor is responsive to the applied ECM. If the threat factor is responsive to the applied countermeasure, then a determination is made as to whether the hostile radar is sufficiently disrupted by the countermeasure to meet defined effectiveness criteria. If the defined effectiveness criteria are met, then the countermeasure is deemed to be effective against the hostile radar.

An example of a defined effectiveness criterion could be a requirement that a projectile or missile that is guided by the radar threat is caused to miss its intended target by a defined distance. Another example might be a requirement that a radar threat that changes its behavior when a target is detected, for example by continuing to direct its RF emissions toward the target, is caused by an applied countermeasure to return to a behavior that is typical when a target has not been detected, such as continuously varying the direction in which it emits RF.

If the countermeasure is not deemed to be effective against the hostile radar, then in embodiments the countermeasure is modified and the effectiveness of the modified countermeasure is assessed by repeating the process described above. For example, modifying the countermeasure can include changing or adjusting at least one parameter of the countermeasure. In embodiments, an optimization process is applied to the countermeasure, such as the method disclosed by co-pending U.S. application Ser. No. 16/953, 568, also by the present Applicant, which is incorporated herein in its entirety by reference for all purposes.

As an alternative or in addition, if the countermeasure is not deemed to be effective against the hostile radar, then embodiments can proceed to select a different countermeasure and assess its effectiveness against the hostile radar according to the process described above. And in various embodiments, at least one friendly asset is caused to avoid exposure to the hostile radar so long as no applied countermeasure has been deemed to be effective against the hostile radar.

In some embodiments, at least one of the radar-associated factors is a weapon, such as a projectile weapon or a missile, that is believed to be under control of the hostile radar. As a simple example, the effectiveness of an applied ECM could be evaluated in terms of whether or not (and to what degree) a radar-guided projectile weapon is misdirected, or an incoming radar-guided missile veers off-target.

In various embodiments, at least one of the radar-associated factors is a feature of at least one RF waveform that is emitted by the hostile radar. The feature is detected and monitored, and any change to the feature that appears to be responsive to application of the ECM is evaluated. Typically, any detected change in a hostile radar waveform that appears to be correlated with the application of an ECM will be considered to indicate that the ECM is having some effect on the hostile radar, at least in causing the hostile radar to attempt to mitigate the applied ECM.

Certain changes in a hostile radar waveform are considered, in embodiments, to be indicative of disruption of a hostile radar. For example, if one or more features of a waveform emitted by a hostile radar continue to change in behavior as an ECM is applied, this can be an indication that the hostile radar is failing to successfully mitigate the applied ECM, and is continuing to try different mitigation strategies. Another indication that a radar threat is being disrupted could be a return of a feature of the hostile radar waveform to a state that existed before the hostile radar posed an imminent threat to an asset, indicating that the radar threat has returned to a pre-threat status. For example, if a hostile radar that was originally emitting an RF waveform over a geographically distributed area, but appeared to focus and "lock" onto a friendly asset upon detection thereof, returns to emitting the RF waveform over the geographically distributed area in response to application of an ECM, then this can be an indication that the ECM is effective, and that the hostile radar has "lost lock" as a result of applying the ECM and has returned to seeking targets.

In embodiments, when a countermeasure is applied to a known radar threat against which the countermeasure was previously verified to be effective, the ECM assessment method that is disclosed herein can be used in real time to determine whether the known radar has become unresponsive to the pre-verified countermeasure, so that a more effective countermeasure can be sought and/or battle tactics can be adjusted as needed.

Once an ECM from an available library of countermeasures has been selected, applied, and assessed in real time to be effective in disrupting a novel or unresponsive hostile radar, it may be expedient to continue applying the effective countermeasure until an imminent threat has been avoided or a mission has been completed. In other circumstances, it may be possible to continue to evaluate candidate ECM's selected from at least one library of countermeasures until the most effective candidate ECM and associated parameter set have been identified.

In embodiments, the selection of the most effective countermeasure comprises selecting as candidate countermeasures and candidate parameter sets one or more defined countermeasures and associated parameter sets from a countermeasure database, for example by applying the method of co-pending U.S. application Ser. No. 16/953,562, also by the present Applicant, which is incorporated herein in its entirety by reference for all purposes. Each of the candidate countermeasures, as populated with the candidate parameter sets, can then be applied to the hostile radar in turn and assessed in real time according to the disclosed method to determine which countermeasure and associated parameter set is the most effective.

In embodiments, the effectiveness of an applied candidate countermeasure can be periodically or continuously assessed as one or more parameters of the applied countermeasure are varied in an attempt to improve and potentially optimize the effectiveness of the candidate countermeasure, for example according to the method of co-pending U.S. application Ser. No. 16/953,568, also by the present Applicant, which is incorporated herein in its entirety by reference for all purposes. Some embodiments include applying more than one candidate countermeasure sequentially or simultaneously to the hostile radar.

In addition to improving battle strategies and enhancing the real time effectiveness of a countermeasure strategy against novel, ambiguous, and unresponsive radar threats, the countermeasure assessment method disclosed herein can also be used to update threat databases and associated countermeasure libraries for enhanced utility during future encounters with novel, ambiguous, and unresponsive radar threats. For example, a countermeasure library can be updated to indicate that a certain known countermeasure is, or continues to be, effective against a specific known radar threat, or to record that a specific, known radar threat having an associated known threat waveform may be unresponsive to a countermeasure that was previously known to be effective.

Furthermore, if a known countermeasure is found and/or optimized to be effective against a novel or unresponsive radar threat, this information can also be added to a threat database and associated library of countermeasures.

A first general aspect of the present disclosure is a method of determining if an applied countermeasure is effective against a radar threat that is emitting a hostile radio frequency (RF) waveform. The method includes the following steps:

A) applying the countermeasure to the radar threat;
B) detecting and monitoring at least one threat factor that is associated with the radar threat while the applied countermeasure is being applied to the radar threat;
C) determining if the threat factor is responsive to the applied countermeasure;
D) if the threat factor is responsive to the applied countermeasure, determining if the radar threat is sufficiently disrupted by the applied countermeasure to meet defined countermeasure effectiveness criteria; and
E) if the defined countermeasure effectiveness criteria are met, deeming the applied countermeasure to be effective against the radar threat.

In embodiments the method further includes, if the applied countermeasure is not deemed to be effective against the radar threat, then at least one of: changing at least one parameter of the applied countermeasure, and repeating steps A) through E), applying another countermeasure to the radar threat and repeating steps B) through E), and causing at least one friendly asset to avoid exposure to the hostile radar.

In any of the above embodiments, the threat factor can be a weapon that is directed by the radar threat, and step C) can include determining if the weapon is being misdirected due to application of the applied countermeasure. In some of these embodiments, the weapon is a projectile weapon that is guided by the radar threat, or a missile that is guided by the radar threat.

In any of the above embodiments, the threat factor can be at least one feature of the hostile RF waveform that is emitted by the radar threat. In some of these embodiments, step C) includes determining if the at least one feature changes in response to application of the applied countermeasure. In any of these embodiments, step D) can include determining if the at least one feature of the hostile RF waveform continues to change during application of the applied countermeasure. In any of these embodiments, step D) can include determining if the at least one feature of the hostile RF waveform has returned to a state that applied to the feature before the applied countermeasure was applied to the radar threat. And in any of these embodiments, step D) can include determining if a geographic distribution over which the hostile RF waveform is being emitted has changed.

In any of the above embodiments, step A) can includes detecting at least one detected feature of the hostile RF waveform, comparing the at least one detected feature to known features of known radar threats that are included in at least one threat database, upon determining that there is not a unique match between the at least one detected feature and the known features, designating the radar threat as a novel or ambiguous radar threat, or upon determining that there is a unique match between the at least one detected feature and at least one known feature of one of the known radar threats, designating the radar threat as a known radar threat, and if the radar threat is designated as a known radar threat, selecting from an available library of countermeasures a pre-verified countermeasure that corresponds to the known radar threat as the applied countermeasure, and applying the pre-verified countermeasure to the known radar threat according to step A). Some of these embodiments further include, if the radar threat is designated as a known radar threat, and if in step E) the pre-verified countermeasure is not deemed to be effective against the known radar threat, re-designating the known radar threat as an unresponsive radar threat. In any of these embodiments, if the radar threat is designated as a novel or ambiguous radar threat, or if the radar threat is designated as a known radar threat, but in step E) the pre-verified countermeasure is not deemed to be effective against the known radar threat, whereby the known radar threat is re-designated as an unresponsive radar threat, then the method further includes selecting a candidate countermeasure from one of the libraries of available countermeasures as the applied countermeasure, and applying the candidate countermeasure to the known or unresponsive threat according to step A).

Any of the above embodiments can further include, if it is determined in step E) that the applied countermeasure is effective against the radar threat, and if the radar threat poses a danger to a friendly asset, continuing to apply the applied countermeasure to the radar threat until the radar threat no longer poses a danger to the friendly asset.

In any of the above embodiments, the applied countermeasure can be a candidate countermeasure, and the method can further include, if it is determined in step E) that the candidate countermeasure is not effective against the radar threat, modifying the candidate countermeasure or selecting a new candidate countermeasure as the applied countermeasure and repeating steps A) through E).

In any of the above embodiments, the applied countermeasure can be a candidate countermeasure, and the method can further include, if it is determined in step E) that the candidate countermeasure is effective against the radar threat, modifying the candidate countermeasure or selecting a new candidate countermeasure as the applied countermeasure and continuing to repeat steps A) through E) until a most-effective countermeasure is identified.

In any of the above embodiments, step A) can include applying a plurality of countermeasures to the radar threat. In some of these embodiments, at least two of the applied countermeasures are applied simultaneously to the radar threat.

Any of the above embodiments can further include updating at least one threat database and at least one countermeasure library to include information regarding the radar threat and regarding whether it is disrupted by the applied countermeasure.

A second general aspect of the present disclosure is an apparatus for determining if an applied countermeasure is effective against a radar threat that is emitting a hostile radio frequency (RF) waveform, said hostile RF waveform being unknown, ambiguous, or unresponsive. The apparatus includes an antenna configured to receive the hostile RF waveform, a receiver configured to amplify and digitize the hostile RF waveform, a signal analyzer configured to isolate the hostile RF waveform, a countermeasure library containing countermeasures that are pre-verified as effective in disrupting associated known radar threats, and a Cognitive Electronic Warfare System (CEW) configured to carry out the method of the first general aspect.

In embodiments, the signal analyzer is further configured to use data-driven machine learning to separate and isolate the hostile RF waveform from other signals received by the antenna.

And in any of the above embodiments, the apparatus can further include a threat database, and a waveform identifier configured to compare the hostile RF waveform with known RF waveforms stored in the threat database, and to determine if the radar threat is known, unknown, or ambiguous.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a system and method for assessing the effectiveness of an applied countermeasure against a hostile radar in real time as it is applied against the hostile radar under battle conditions.

Figure 1:
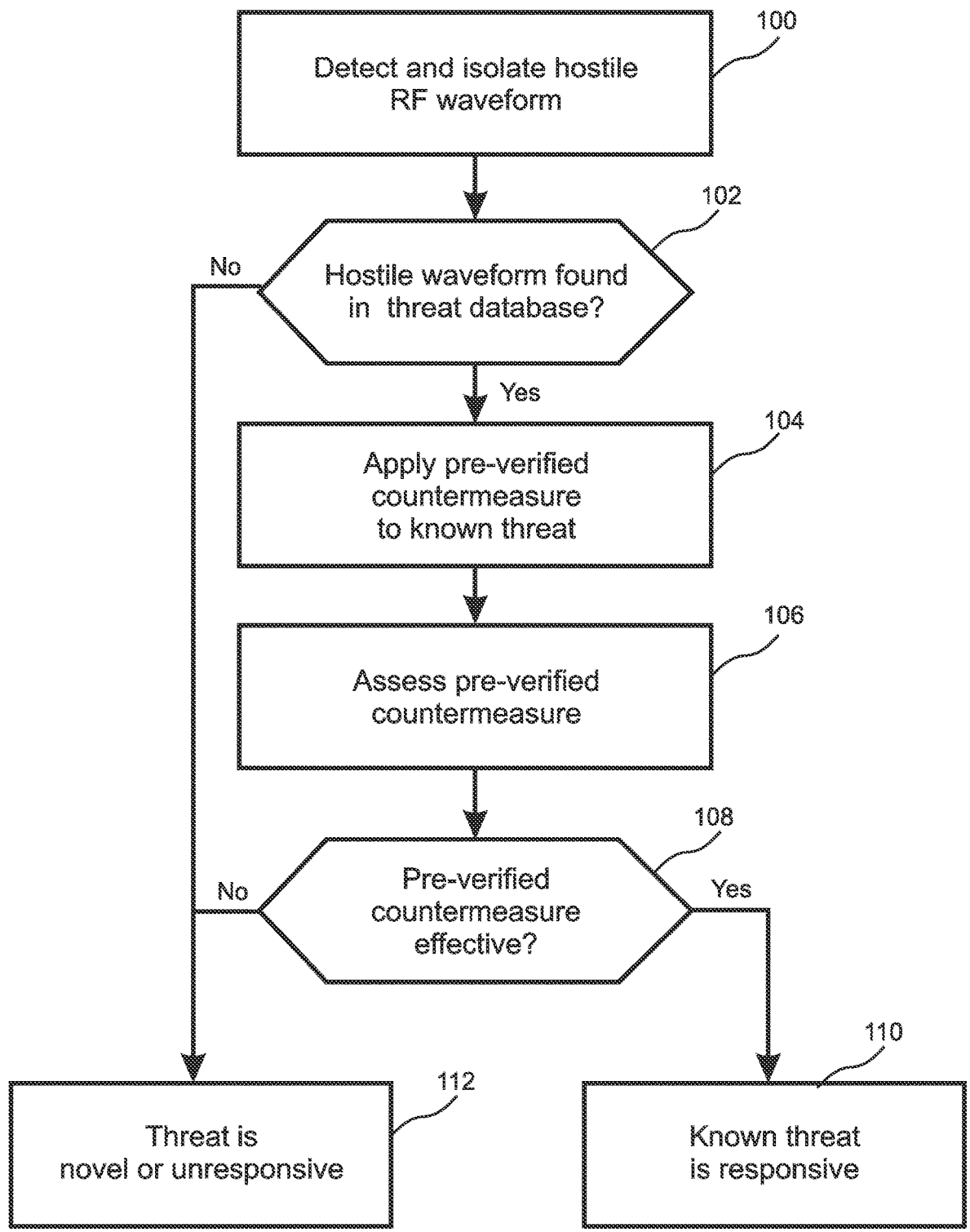
FIG. 1 is a flow diagram that illustrates determining if a known radar threat is unresponsive according to a method embodiment of the present disclosure.

With reference to FIG. 1, in embodiments, upon encountering a radar threat, embodiments detect and isolate at least one RF waveform 100 that is being emitted by the hostile threat. In embodiments, features of the detected RF waveform are then compared with features of known RF waveforms included in at least one available threat database. If a known threat is not found in one of the threat databases having features that substantially match the detected features of the radar threat 102, then the radar threat is designated as a novel threat 112.

If a known threat is found in one of the threat databases having features that uniquely match the detected features of the radar threat 102, then the radar threat is designated as a known radar threat, and a corresponding electronic countermeasure (ECM) that has been pre-verified as being effective against the known radar threat is retrieved from an available countermeasure library and applied to the radar threat 104. As is described in more detail below, the effectiveness of the applied, pre-verified countermeasure is then assessed in real time 106 as the pre-verified countermeasure is applied, and a determination is made 108 as to whether or not the pre-verified countermeasure is effective against the known radar threat. If the assessment indicates that the pre-verified countermeasure is effective against the known radar threat, then the radar threat is considered to be responsive to the pre-verified countermeasure 110. On the other hand, if the assessment indicates that the pre-verified countermeasure is not effective against the known radar threat, then the radar threat is re-designated as being an unresponsive radar threat, because it is unresponsive to the pre-verified countermeasure 110.

Figure 2A:
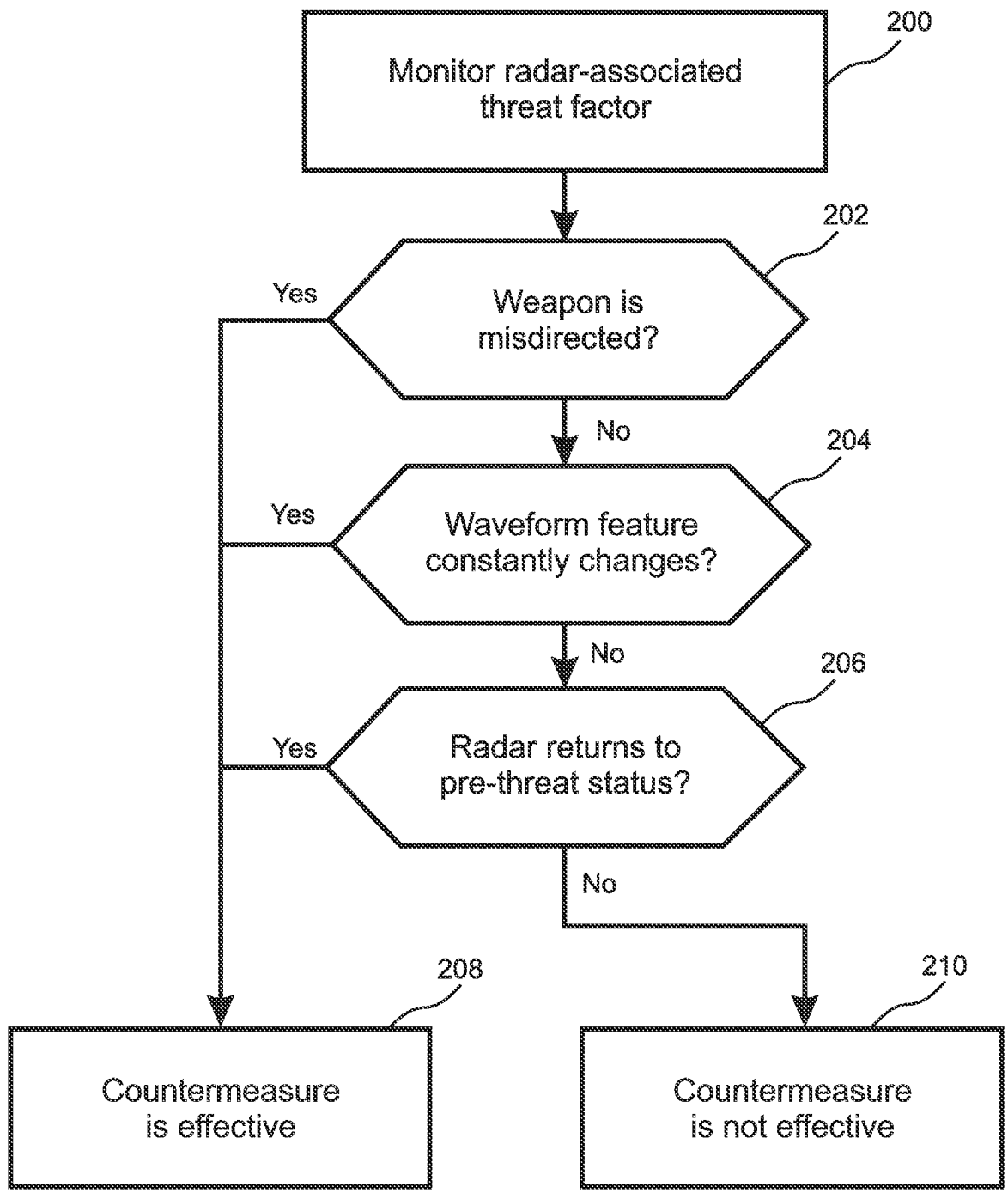
FIG. 2A is a flow diagram that illustrates assessing the effectiveness of an applied countermeasure in real time according to a method embodiment of the present disclosure.

With reference to FIG. 2A, in embodiments the assessment in real time of an applied countermeasure includes monitoring and evaluating at least one radar-associated "threat factor" 200 that is cooperative with the hostile radar to determine if, and in embodiments to what degree, the applied ECM is disrupting the hostile radar. If a monitored threat factor is responsive to the applied countermeasure 202, 204, 206, then a determination is made as to whether the hostile radar is sufficiently disrupted by the countermeasure to meet defined effectiveness criteria. If the defined effectiveness criteria are met, then the countermeasure is deemed to be effective against the hostile radar 208.

In some embodiments, at least one of the radar-associated factors is a weapon 202, such as a projectile weapon or a missile that is believed to be under control of the radar. In some of these embodiments, an effectiveness criterion could be a requirement that a radar-guided projectile weapon is misdirected to a specified degree, or an incoming radar-guided missile veers off-target to a specified extent.

In various embodiments, at least one of the threat factors is a feature of at least one RF waveform that is emitted by the hostile radar. The feature is detected and monitored, and any changes to the feature that appear to be responsive to application of the ECM are evaluated. Typically, any detected change in a hostile radar waveform that appears to be correlated with the application of an ECM will be considered to indicate that the hostile radar is responsive to the ECM, i.e. that the ECM is having some effect on the hostile radar, at least in causing the hostile radar to attempt to mitigate the applied ECM.

Certain changes in a hostile radar waveform are considered, in embodiments, to indicate disruption of a hostile radar. For example, if one or more features of a waveform emitted by a hostile radar continue to change in behavior 204 as an ECM is applied, this can be an indication that the hostile radar is failing to successfully mitigate the applied ECM, and is continuing to try different mitigation strategies.

In some of these embodiments, the effectiveness criteria include a requirement that a feature of the hostile radar waveform returns to a state that existed before the hostile radar posed an imminent threat to an asset, indicating that the radar threat has returned to a pre-threat status. For example, if a hostile radar that was originally emitting a waveform over a geographically distributed area, but appeared to focus and "lock" onto a friendly target upon detection thereof, returns to emitting the waveform over the geographically distributed area in response to application of an ECM, then this can be an indication that the ECM is effective, and that the hostile radar has "lost lock" 206 as a result of applying the ECM and has returned to seeking targets. Accordingly, the disclosed method assesses the effectiveness of the applied countermeasure in real time according to whether one or more factors 202, 204, 206 is satisfied, and thereby determines if the applied countermeasure is effective 208 or is not effective 210.

Figure 2B:
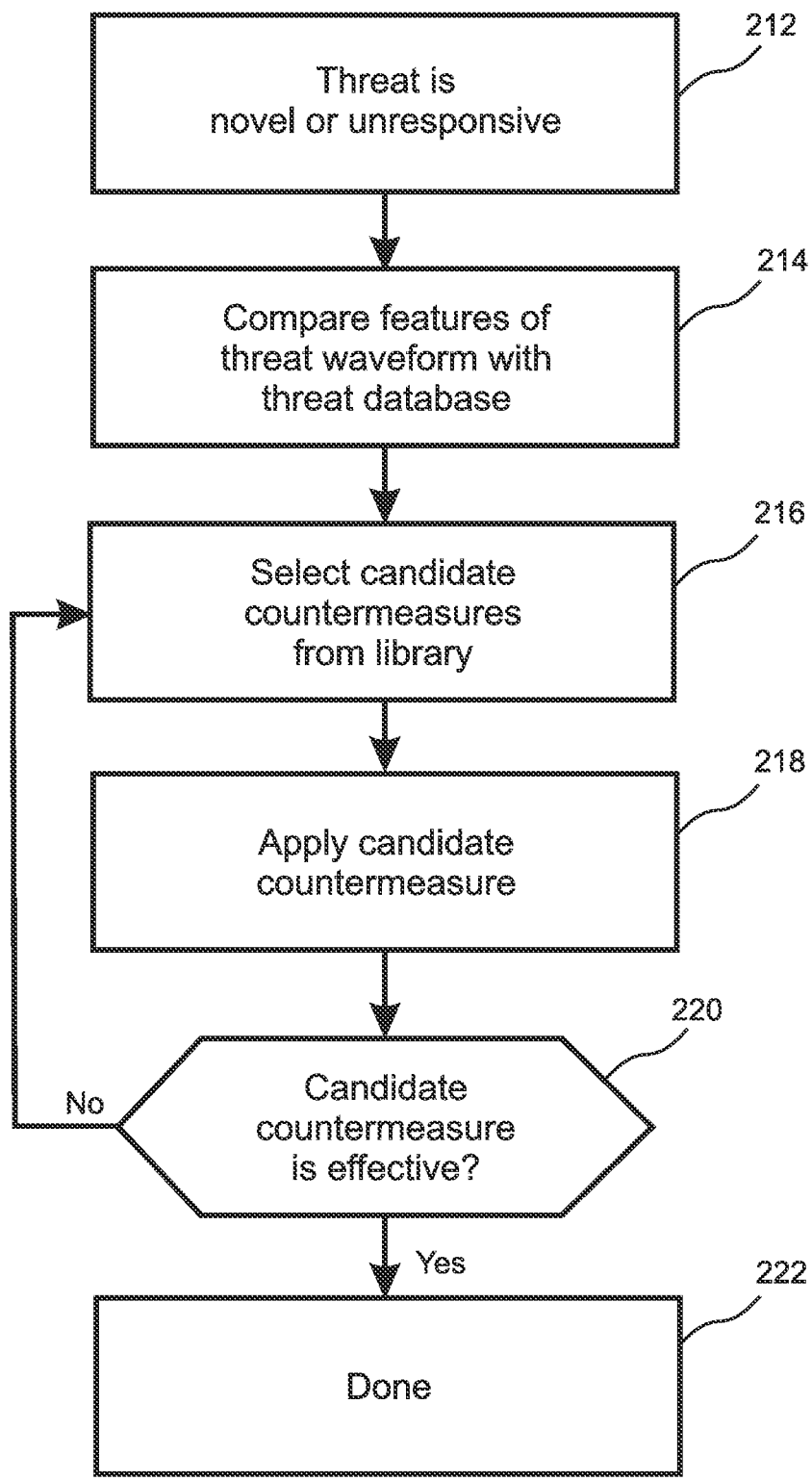
FIG. 2B is a flow diagram that illustrates identifying an effective countermeasure according to a method embodiment of the present disclosure.

With reference to FIG. 2B, in various embodiments the ECM assessment method disclosed herein can be used in real time to assist in selecting a "most-effective" countermeasure from a database of known countermeasures for application against a novel or unresponsive hostile radar 212. In embodiments, the selection of the most effective countermeasure comprises selecting one or more defined countermeasures and associated parameter sets from a countermeasure database as candidate countermeasures 216 and candidate parameter sets. Each of the candidate countermeasures, as populated with the candidate parameter sets, can then be applied to the hostile radar in turn 218 and assessed in real time 220 according to the disclosed method to determine which countermeasure and associated parameter set is the most effective. Some embodiments include applying more than one candidate countermeasure simultaneously to the hostile radar either alternately or simultaneously.

In some of these embodiments, one or more detected features of a hostile radar RF waveform are used to select the one or more "candidate" known and/or defined countermeasures from one or more available libraries of electronic countermeasures. The selection can be based, for example, on similarities between detected waveform features of the hostile radar and waveform features of known threats as recorded in a database of known radar threats 214, as is described for example in co-pending U.S. application Ser. No. 16/953,562, also by the present Applicant, which is incorporated herein in its entirety by reference for all purposes. In embodiments, the effectiveness of an applied candidate countermeasure can be periodically or continuously assessed as one or more parameters of the applied countermeasure are varied in an attempt to improve and potentially optimize the effectiveness of the candidate countermeasure, for example according to the method of co-pending U.S. application Ser. No. 16/953,568, also by the present Applicant, which is incorporated herein in its entirety by reference for all purposes.

Once an applied ECM from an available library of countermeasures has been selected and assessed in real time to be effective 222 in disrupting a novel or unresponsive hostile radar, it may be expedient to continue applying the effective countermeasure until an imminent threat has been avoided or a mission has been completed. In other circumstances, it may be possible to continue to evaluate candidate ECM's until the most effective candidate ECM and associated parameter set have been identified.

In addition to improving battle strategies and enhancing the real time effectiveness of a countermeasure strategy against novel and unresponsive radar threats, the countermeasure assessment method that is disclosed herein can also be used to update threat databases and associated countermeasure libraries for enhanced effectiveness during future encounters with novel and unresponsive hostile radars. For example, a countermeasure library can be updated to indicate that a certain known countermeasure is, or continues to be, effective against a specific known radar threat, or to record that a specific, known radar threat having an associated known threat waveform may be unresponsive to a countermeasure that was previously known to be effective.

Furthermore, if a known countermeasure is found to be effective against a novel, ambiguous, or unresponsive radar threat, this information can also be added to a threat database and associated library of countermeasures.

Figure 3:
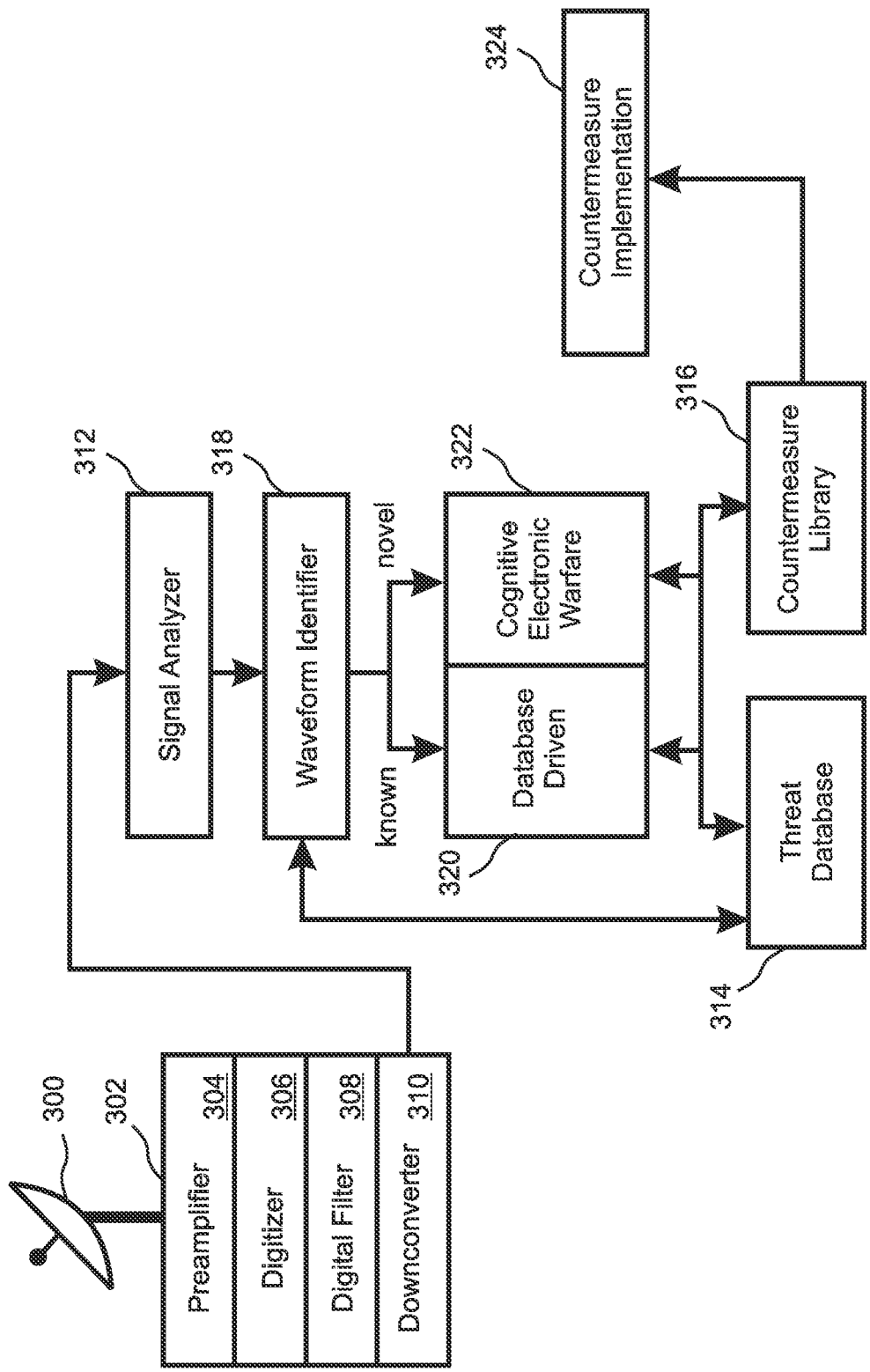
FIG. 3 is a block diagram that illustrates an apparatus embodiment of the present disclosure.

With reference to FIG. 3, in embodiments the disclosed system includes an antenna 300 that captures wireless RF signals and directs them to receiver electronics 302 that may include a preamplifier 304 and digitizer 306, as well as a digital filter 308 and a digital downconverter 310 configured to eliminate the carrier frequency of the detected RF and to convert the detected RF to baseband. Embodiments of the present system further include a Signal Analyzer module 312 that uses data-driven machine learning to separate (de-interleave) and isolate from each other the hostile radar-emitted waveforms that are present in the RF environment, and, in embodiments, associates each of the hostile waveforms with the hostile radar from which it is being emitted. In embodiments, data-driven machine learning, such as self-guided clustering, is used to de-interleave the waveforms, determine the features that characterize each of the waveforms, and in some embodiments to classify each of the hostile waveforms as to the inferred mode and intent of the associated radar according to its features and behavior.

The system further includes at least one countermeasure library 316, and in embodiments also at least one threat database 314 in which characterizing features of known threat waveforms are stored, together with links between the known threat waveforms and associated defined and known countermeasures contained in the countermeasure library 316 that were previously verified to be effective against the threats that emit the known threat waveforms. In embodiments, the threat database 314 also includes settings and/or parameters associated with each of the threat waveforms with which an associated defined countermeasure is to be populated.

In embodiments, a waveform identifier 318 compares detected waveforms that are isolated by the Signal Analyzer 312 with the known hostile waveforms that are contained in the threat database 314, and identifies each of the detected waveforms as either a known, ambiguous, or novel hostile waveform that is a candidate for application of a countermeasure, or as non-hostile waveform that is not a candidate for application of a countermeasure. If a detected waveform is uniquely matched with a hostile waveform found in the threat database 314 and is therefore a known hostile waveform, then in embodiments a database driven warfare system 320 selects a defined or known countermeasure from the countermeasure library 316 according to the links between the known threats and countermeasures. The selected countermeasure is then forwarded to appropriate countermeasure implementation systems 324 for population with appropriate parameters and implementation against the radar threat. A Cognitive Electronic Warfare (CEW) system 322 monitors at least one radar-associated factor as the countermeasure is applied to the radar threat, and assesses whether or not the applied countermeasure is effective. If not, then the known threat is re-classified as an unresponsive threat, and is treated as if it were a novel threat.

Upon encountering a novel, ambiguous, or unresponsive threat, the CEW 322 in embodiments compares features of the waveform emitted by the novel or unresponsive threat and selects known and/or defined countermeasures from the countermeasure library 316 as candidate countermeasures according to the methods described above. The candidate countermeasures are then implemented in turn or, in embodiments in combinations 324, and evaluated by the CEW 322 until an effective countermeasure is identified.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. An apparatus for determining if an applied countermeasure is effective against a radar threat that is emitting a hostile radio frequency (RF) waveform, said hostile RF waveform being unknown, ambiguous, or unresponsive, the apparatus comprising:
   an antenna configured to receive the hostile RF waveform;
   a receiver operably connected to the antenna and configured to amplify and digitize the hostile RF waveform;
   a signal analyzer operably connected to the antenna and configured to isolate the hostile RF waveform;
   a waveform identifier operably connected to the signal analyzer and configured to compare hostile RF waveforms isolated by the signal analyzer and identify a countermeasure stored in a countermeasure library containing countermeasures that are pre-verified as effective in disrupting associated known radar threats; and
   a Cognitive Electronic Warfare System (CEW) configured to carry out:
   A) applying a plurality of countermeasures, selected from a countermeasures library, to the radar threat, wherein the applied plurality of countermeasures are each populated with an initial parameter set comprising at least one parameter to create candidate countermeasures;
   B) detecting and monitoring at least one threat factor that is associated with the radar threat while the applied countermeasures are being applied to the radar threat;
   C) determining if the threat factor is responsive to the applied countermeasures;
   D) if the threat factor is responsive to the applied countermeasures, determining if the radar threat is sufficiently disrupted by the applied countermeasures to meet defined countermeasure effectiveness criteria; and
   E) if the defined countermeasure effectiveness criteria are not met by the applied countermeasure, vary at least one of the parameters, wherein varying the at least one of the parameters includes correlating changes in the at least one of the parameters with resultant changes in the RF waveforms emitted by the radar threat
   F) repeat steps C through E until the defined countermeasure effectiveness criteria are met, or until the defined countermeasure effectiveness criteria is assessed as maximized; and
   G) if the defined countermeasure effectiveness criteria are met, designate the candidate countermeasure as an effective countermeasure against the radar threat.

2. The apparatus of claim 1, further comprising if the applied countermeasure is not deemed to be effective against the radar threat, then at least one of:
   changing at least one parameter of the applied countermeasures, and repeating steps A) through E);

applying another countermeasure to the radar threat and repeating steps B) through E); and causing at least one asset to avoid exposure to the hostile radar.

3. The apparatus of claim 1, wherein the threat factor is a weapon that is directed by the radar threat, and wherein step C) includes determining if the weapon is being misdirected due to application of the applied countermeasures.

4. The apparatus of claim 3, wherein the weapon is a projectile weapon that is guided by the radar threat.

5. The apparatus of claim 3, wherein the weapon is a missile that is guided by the radar threat.

6. The apparatus of claim 1, wherein the threat factor is at least one feature of the hostile RF waveform that is emitted by the radar threat.

7. The apparatus of claim 6, wherein step C) includes determining if the at least one feature changes in response to application of the applied countermeasures.

8. The apparatus of claim 6, wherein step D) includes determining if the at least one feature of the hostile RF waveform continues to change during application of the applied countermeasures.

9. The apparatus of claim 6, wherein step D) includes determining if the at least one feature of the hostile RF waveform has returned to a state that applied to the feature before the applied countermeasures were applied to the radar threat.

10. The apparatus of claim 6, wherein step D) includes determining if a geographic distribution over which the hostile RF waveform is being emitted has changed.

11. The apparatus of claim 1, wherein step A) includes:
detecting at least one detected feature of the hostile RF waveform;
comparing the at least one detected feature to known features of known radar threats that are included in at least one threat database;
upon determining that there is not a unique match between the at least one detected feature and the known features, designating the radar threat as a novel or ambiguous radar threat, or upon determining that there is a unique match between the at least one detected feature and at least one known feature of one of the known radar threats, designating the radar threat as a known radar threat; and
if the radar threat is designated as a known radar threat, selecting from the available library of countermeasures pre-verified countermeasures that corresponds to the known radar threat as the applied countermeasures, and applying the pre-verified countermeasures to the known radar threat according to step A).

12. The apparatus of claim 11, further comprising if the radar threat is designated as a known radar threat, and if in step E) the pre-verified countermeasures is not deemed to be effective against the known radar threat, re-designating the known radar threat as an unresponsive radar threat.

13. The apparatus of claim 11, wherein if the radar threat is designated as a novel or ambiguous radar threat, or if the radar threat is designated as a known radar threat, but in step E) the pre-verified countermeasures are not deemed to be effective against the known radar threat, whereby the known radar threat is re-designated as an unresponsive radar threat, then the method further includes:
selecting candidate countermeasures from one of the libraries of available countermeasures as the applied countermeasures; and
applying the candidate countermeasures to the known or unresponsive threat according to step A).

14. The apparatus of claim 1, further comprising, if it is determined in step E) that the applied countermeasures are effective against the radar threat, and if the radar threat poses a danger to a friendly asset, continuing to apply the applied countermeasures to the radar threat until the radar threat no longer poses a danger to the friendly asset.

15. The apparatus of claim 1, wherein at least two of the applied countermeasures are applied simultaneously to the radar threat.

16. The apparatus of claim 1, further comprising updating at least one threat database and at least one countermeasure library to include information regarding the radar threat and regarding whether it is disrupted by the applied countermeasures.

* * * * *